Patented Jan. 12, 1932

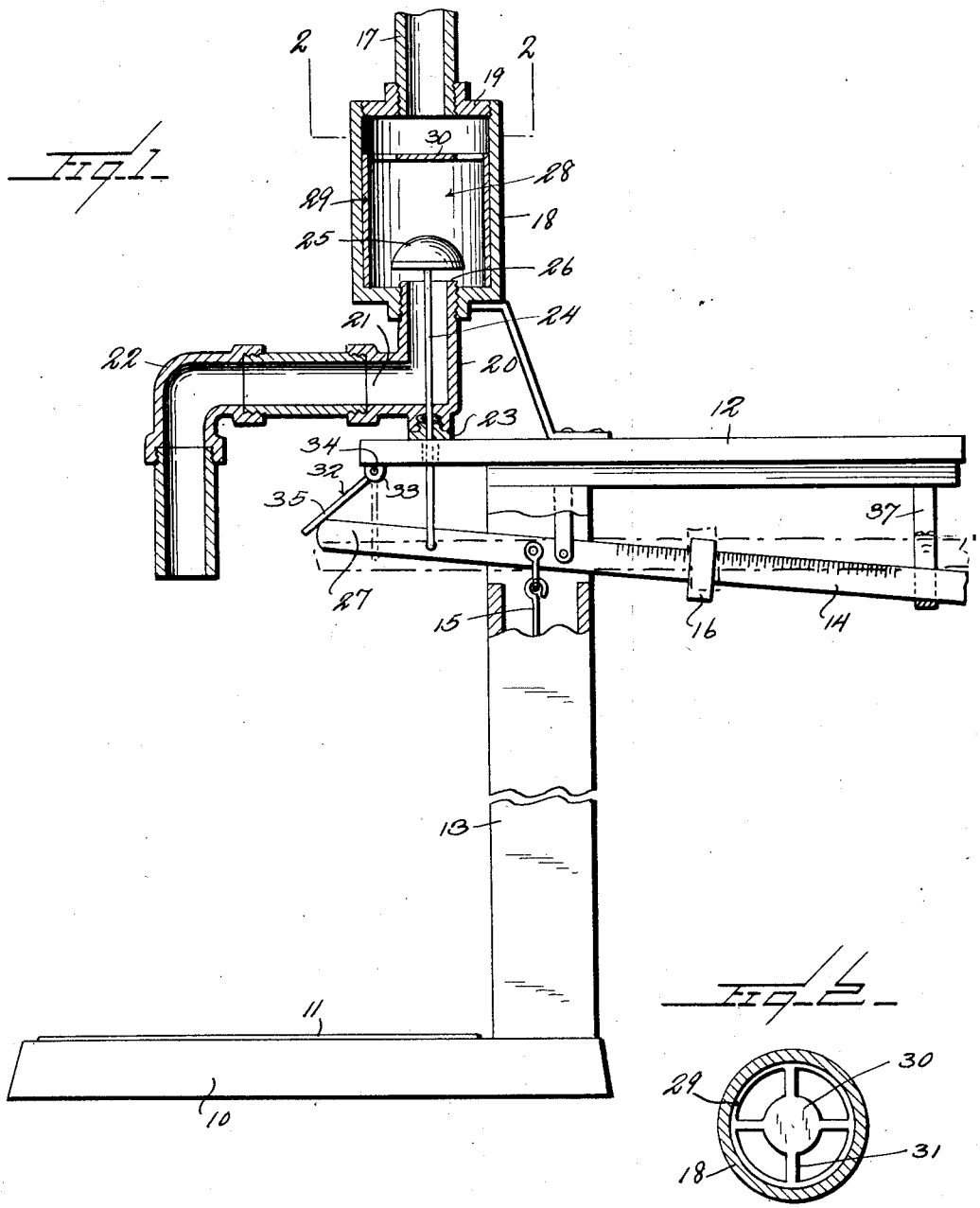

1,840,906

UNITED STATES PATENT OFFICE

ARTHUR LARSEN AND WILLIAM F. McCOMISKEY, OF MINNEAPOLIS, MINNESOTA

MEASURING DISPENSER

Application filed April 7, 1931. Serial No. 528,376.

The present invention relates to measuring or dispensing devices.

An object of this invention is to provide means whereby a measured quantity of material by weight may be removed from a supply member, the supply being cut off when a predetermined quantity of material has been withdrawn therefrom.

The above and various other objects and advantages of this invention will in part be described in and in part be understood from the following detailed description of the present preferred embodiment, the same being illustrated in the accompanying drawings, wherein:—

Figure 1 is a detailed side elevation partly in vertical section of a device constructed according to the preferred embodiment of this invention;

Figure 2 is a sectional view taken on the line 2—2 of Figure 1; and

Figure 3 is a detail end elevation of the weighing arm with the lock member in locked position.

Referring to the drawings wherein like numerals of reference designate corresponding parts throughout the several views, the numeral 10 designates generally a platform scale or weighing member which is provided with an article supporting platform 11, a vertically disposed standard 13 and a horizontally disposed top member or beam 12 which is fixedly secured to the upper end of the upright 13. A weighing beam 14 is rockably supported on the upright 13 and connected to the platform 11 by a suitable connecting bar or member 15. The beam 14 is provided with a conventional slide member 16 which is adapted to be moved along the beam so that the beam will balance when a predetermined quantity or weight has been placed on the platform 11.

A pipe member 17 is supported above the scale 10 and connected at one end to a suitable source of supply (not shown) which supply may be either liquid or dry material, and the other end of the pipe 17 is provided with a cylindrical valve casing 18 which is threadably connected to the pipe 17 by means of a threaded cap member 19. The lower or other end of the casing 18 is connected to a hollow support or casing 20 which is mounted on the top 12, one end of the casing 20 being threadably mounted in the lower end of the housing 18. The housing 20 is open at the upper end thereof and communicates with the interior of the housing 18, and the housing or casing 20 is also provided with an outlet port 21 which constitutes a discharge port and a nozzle, generally designated as 22, is connected to this outlet port and discharges downwardly toward the platform 11.

The bottom of the casing 20 is secured to the platform 12, and a packing gland 23 is threadably mounted therein, the packing gland slidably receiving an elongated valve stem 24 which extneds through the casing 20, and a valve head 25 is adapted to seat on the casing 20 so as to cut off the passage of material flowing through the spout 22. The valve head 25 in the present instance is constructed in inverted cup-shaped form which seats on an inverted apertured seat 26. The lower end of the stem 24 is rockably connected to an extension 27 of the weight lever or rod 14.

A baffle member, generally designated as 28, is mounted within the cylindrical valve casing 18 and extends upwardly from the valve seat 26, this baffle 28 comprising a substantially elongated cylindrical member 29 which at the upper end thereof is provided with a baffle plate 30 that is held in outstanding relation to the wall of the cylinder 29 by means of braces 31 or the like. Through the use of these braces or supports 31, there are provided four openings about the periphery of the baffle 30, which baffle is disposed at a point slightly below the discharge end of the supply pipe 17 so that the liquid or material passing downwardly through the supply pipe 17 will not strike the top of the valve 25 but will strike the baffle 30 and flow over the periphery thereof and within the baffle supporting cylinder 29. In this manner, the weight of the column of material in the pipe 17 does not directly strike the valve head 25 but instead strikes the baffle plate 30.

A locking member, generally designated as 100

32, is rockably supported from the top member 12 by means of lugs or brackets 33 which engage outstanding trunnions or pintles 34 carried by the locking member 32, this locking member having a body portion 35 and a slot 36 in the lower edge thereof which engages the upper edge of the lever extension 27. This lock is adapted to gravitatingly hang in substantially vertical position when the lever 14 and the extension 27 are horizontal and the valve 25 is in closed position. Through the use of this lock 32, when the container or receptacle is filled with the material discharging from the spout 22, the lock 32 will prevent further discharge of the material when the receptacle is removed from the platform 11.

A weighing arm guide 37 is adapted to engage the weighing arm 14 so as to limit the vertical rocking of this weighing arm 14 in each direction. This guide or stop member 36 will, therefore, cooperate to prevent undue opening of the valve member 25 when the releasable lock 32 is swung outwardly into released position so as to permit the valve 25 to move upwardly into open position. The valve stem 24 may be so adjusted that as soon as it moves into closed position, the quantity of material left in the tube or spout 22 when discharged into the receptacle disposed on the platform 11 will equal the weight designated or indicated on the scale carried by the weighing arm 14.

In the use of this device, a suitable receptacle may be mounted on the platform 11 and the slide 16 adjusted longitudinally on the weighing arm 14 whereupon the releasable lock 32 may be swung outwardly into released position. The extension 27 will then be moved upwardly coactive with the dropping or downward swinging movement of the weighing arm 14 which will also carry the valve 25 into open position. The material in the supply pipe 17 will then flow downwardly into the valve cylinder or casing 18 and downwardly through the inner cylinder 28 passing the periphery of the baffle 30. When a predetermined quantity of material has entered the receptacle, the weighing arm 14 will swing upwardly so as to coactively lower the extension 27 which is disposed oppositely from the weighing arm 14 and thereby move the valve 25 downwardly into closed position, and the material remaining in the casing 20 and the spout 22 will flow outwardly of the spout into the receptacle. This remaining material when disposed in the receptacle and added to the material already in the receptacle prior to the closing of the valve 25 will equal in weight the graduation on the scale of the weighing arm 14 oppositely from the slide 16.

It is, of course, understood that various changes and modifications may be made in the details of construction and design of the above specifically described embodiment of this invention without departing from the spirit thereof, such changes and modifications being restricted only by the scope of the following claims.

We claim:—

1. A dispensing device of the character described comprising in combination, a scale, a valve casing, a valve in the casing, means connecting the valve with the scale whereby to move the valve into open or closed position upon rocking movement of the scale weighing arm, a spout communicating with the valve casing, and a gravity operated stop member carried by the scale and engaging the weighing arm whereby to hold the valve into closed position.

2. A measuring dispenser of the character described comprising in combination, a platform scale including a rockable weighing arm, a casing supported by the scale, a valve for said casing, means connecting the valve to the weighing arm whereby to rock the valve into open or closed position upon rocking of the arm, a spout connected to the casing and discharging over the platform scale, and gravity operated stop means carried by the scale and engaging the weighing arm whereby to hold the weighing arm in balanced position upon filling of a receptacle disposed on the platform.

3. In combination, a scale having a platform and a rockable weighing arm, a casing supported above the platform, a discharge spout connected to the casing, a valve member controlling the passage of material through the spout, means connecting the valve to one end of said arm, and a gravity operated swingable locking member carried by the scale and engaging said arm whereby to hold said valve in closed position and coactively prevent opening of the valve upon removal of a filled receptacle from the platform.

4. In combination, a platform scale including a rockable weighing arm, a valve casing, means connecting said valve casing to a source of supply, said valve casing having an opening in the lower end thereof, a second casing disposed between the valve casing and the scale, a discharge spout connected to said second casing, a valve closing the passage of material from the valve casing to said second casing, an extension arm connected to the weighing arm, means conecting the valve to said extension whereby to rock the valve into open or closed position upon rocking of the weighing arm, and a releasable lock swingably carried by the scale and engaging said extension whereby to automatically hold said valve in closed position.

5. In combination, a platform scale including a horizontally disposed rock arm, an enlarged casing, a discharge spout connected to the casing, valve means controlling the passage of material from the casing to the spout, means connecting the valve to the rock arm whereby to move said valve into open or closed position upon rocking of the arm, means connecting the casing to a source of supply, and a baffle member disposed within the casing and about the valve whereby to relieve the pressure on the valve of the material entering the casing through the connecting means.

6. In combination, a weighing member including a rock arm actuated by said weighing member, a valve housing, pipe means connecting the valve housing to a source of supply, said pipe means extending upwardly from the top of the housing, a discharge spout connected to the housing, a valve controlling the passage of material from the housing through the spout, means connecting the valve to the rock arm, a releasable locking member supported above the rock arm and engaging said arm for automatically holding the arm against rocking movement upon filling of a receptacle disposed on the weighing member, and means disposed within the valve casing and above the valve whereby to relieve the valve from pressure of the material entering the valve casing from the connecting means, said latter named means comprising a cylindrical member having an open upper end portion, a baffle disposed concentrically of the connecting means and means for supporting said baffle in said cylindrical member in spaced relation to the inner surface thereof whereby to permit the passage of material about said baffle.

In testimony whereof we hereunto affix our signatures.

ARTHUR LARSEN.
WILLIAM F. McCOMISKEY.